(12) United States Patent  
Ohtsu et al.

(10) Patent No.: US 7,844,156 B2
(45) Date of Patent: Nov. 30, 2010

(54) OPTICAL WAVEGUIDE FILM AND OPTICAL TRANSMITTER AND RECEIVER MODULE

(75) Inventors: Shigemi Ohtsu, Kanagawa (JP); Akira Fujii, Kanagawa (JP); Kazutoshi Yatsuda, Kanagawa (JP); Masahiro Igusa, Kanagawa (JP); Toshihiko Suzuki, Kanagawa (JP); Keishi Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 149 days.

(21) Appl. No.: 12/366,371

(22) Filed: Feb. 5, 2009

(65) Prior Publication Data  
US 2010/0021109 A1 Jan. 28, 2010

(30) Foreign Application Priority Data  
Jul. 24, 2008 (JP) ............................ 2008-190980

(51) Int. Cl.  
*G02B 6/10* (2006.01)

(52) U.S. Cl. ..................... 385/129; 385/130; 385/131

(58) Field of Classification Search ....................... None  
See application file for complete search history.

(56) References Cited  
U.S. PATENT DOCUMENTS

| 5,416,870 A * | 5/1995 | Chun et al. ................ 385/88 |
| 2004/0234224 A1 | 11/2004 | Ishizaki et al. |
| 2005/0174924 A1 | 8/2005 | Martens et al. |
| 2006/0177188 A1 | 8/2006 | Ishizaki et al. |

FOREIGN PATENT DOCUMENTS

| JP | A-4-281406 | 10/1992 |
| JP | A-2000-235127 | 8/2000 |
| JP | A-2005-530286 | 10/2005 |
| JP | A-2007-148457 | 6/2007 |
| WO | WO 2004/027472 A1 | 4/2004 |

* cited by examiner

*Primary Examiner*—Uyen-Chau N Le  
*Assistant Examiner*—Chad H Smith  
(74) *Attorney, Agent, or Firm*—Oliff & Berridge, PLC

(57) ABSTRACT

An optical waveguide includes: an optical waveguide core through which light propagates, at least one end portion of the optical waveguide core in a longitudinal direction thereof having an inclined surface; a reflective layer provided on the inclined surface and formed by a metal layer of silver or a silver alloy; a protective layer disposed to cover the reflective layer; and a cladding portion enclosing the optical waveguide core and having a lower refractive index than that of the optical waveguide core.

11 Claims, 11 Drawing Sheets

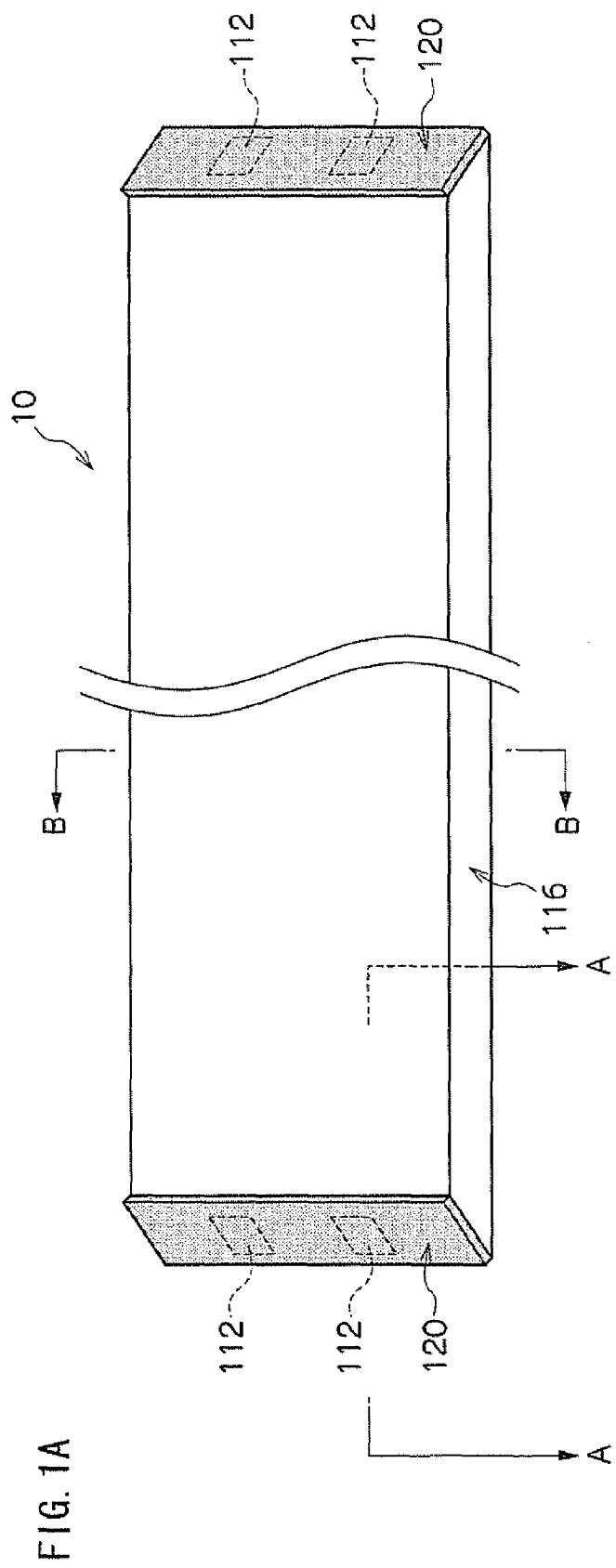
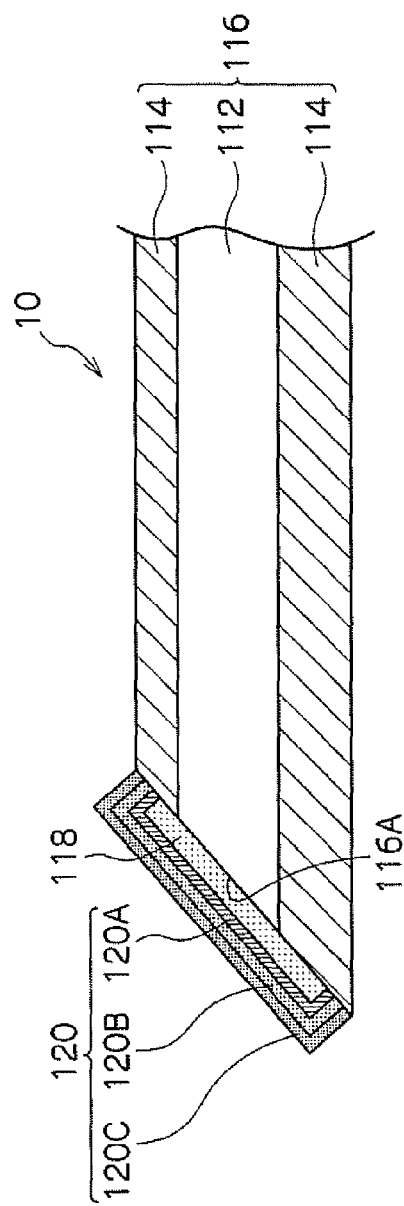
FIG. 1A
FIG. 1B

OPTICAL WAVEGUIDE FILM AND OPTICAL TRANSMITTER AND RECEIVER MODULE

CROSS-REFERENCE TO RELATED APPLICATION

This application is based on and claims priority under 35 USC 119 from Japanese Patent Application No. 2008-190980 filed on Jul. 24, 2008.

BACKGROUND

1. Technical Field

The present invention relates to an optical waveguide film and an optical transmitter and receiver module.

2. Related Art

In IC (Integrated Circuit) technology and LSI (Large Scale Integrated Circuit) technology, optical wiring between devices and/or between boards and/or chips in a device has attracted attention recently as an alternative means for improving the operation speed and/or integration degree to high-density electric wiring. Optical waveguide films have been proposed in order to achieve optical wiring.

SUMMARY

According to an aspect of the invention, there is provided an optical waveguide including:

an optical waveguide core through which light propagates, at least one end portion of the optical waveguide core in a longitudinal direction thereof having an inclined surface;

a reflective layer provided on the inclined surface and including a metal layer including silver or a silver alloy;

a protective layer disposed to cover the reflective layer; and a cladding portion enclosing the optical waveguide core and having a lower refractive index than that of the optical waveguide core.

BRIEF DESCRIPTION OF THE DRAWINGS

Exemplary embodiments of the present invention will be described in detail based on the following figures, wherein:

FIG. 1A is a perspective view schematically showing an optical waveguide film according to an exemplary embodiment, and FIG. 1B is a sectional view taken along line A-A in FIG. 1A;

DETAILED DESCRIPTION

Figure 2A:
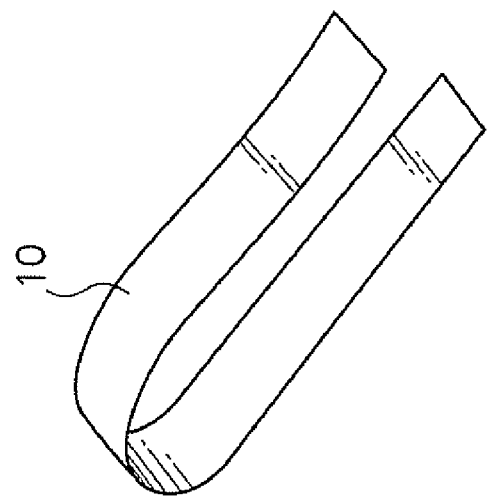
FIGS. 2A and 2B are diagrams indicating that an optical waveguide film according to an exemplary embodiment has flexibility (bending property)

Exemplary embodiments of the present invention are described below with reference to drawings. Elements having substantially the same function and/or action are denoted by the same reference character throughout the drawings, and overlapping descriptions thereof are omitted in some cases.

Optical Waveguide Film

Figure 2B:
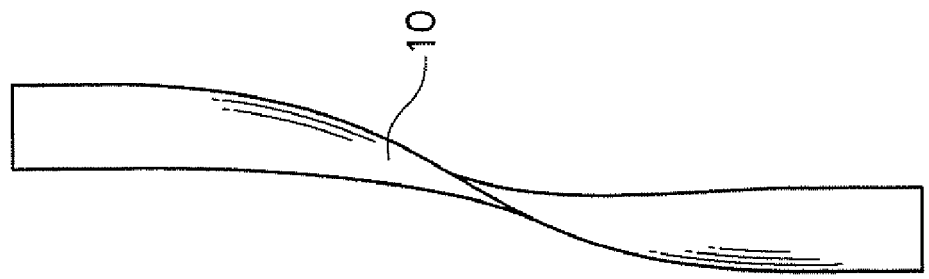

FIG. 1A is a perspective view schematically showing an optical waveguide film according to an exemplary embodiment, and FIG. 1B is a sectional view taken along line A-A in FIG. 1A. FIGS. 2A and 2B are perspective views indicating that an optical waveguide film according to an exemplary embodiment has flexibility (bending property).

Optical waveguide film 10 according to the exemplary embodiment is, for example, a belt-shaped optical waveguide, and has optical waveguide film main body 116 including cladding 114 and optical waveguide cores 112 embedded in cladding 114 as shown in FIGS. 1A and 1B. Optical waveguide film main body 116 has, at each of the ends thereof in its longitudinal direction, mirror surfaces 116A (inclined surface) serving as optical-path deflecting portions for light propagating through optical waveguide 112. On mirror surface 116A, mirror layer 118 (reflective layer) is formed. Mirror layer 118 is covered by protective layer 120.

Optical waveguide cores 112 have a higher refractive index than that of cladding 114. When the difference in refractive index between optical waveguide cores 112 and cladding 114 (the difference between the refractive index of optical waveguide cores 112 and the refractive index of cladding 114) is, for example, 3%, an optical waveguide film is obtained which exhibits hardly any bend loss down to a curvature radius of 1.5 mm when bent. A larger difference in refractive index enables reduction of the curvature radius at which bend loss does not occur. However, in consideration of mechanical bending property of the optical waveguide film and loss caused at the connection to an optical transmitter and receiver element, the difference in refractive index may be from about 2% to about 5%. When the difference in refractive index is from 3% to 4%, optical loss observed when the optical waveguide is bent to a practical degree is very small (even at a curvature radius of 1 mm), and the connection to an optical transmitter and receiver element is easy; therefore, a difference in this range is practically favorable.

Plural optical waveguide cores 112 are arranged in the same plane in the direction of the width of optical waveguide film 10, and are arranged parallel to each other such that a beam of light propagates through each waveguide core 112 and the respective beams travel in parallel to each other. In the present exemplary embodiment, two optical waveguide cores 112 are disposed. At each end of each optical waveguide core 112 in the longitudinal direction thereof, a mirror surface 116A is formed at an oblique angle with respect to the longitudinal direction. Mirror surface 116A is configured to form an angle of, for example, 45° with respect to the longitudinal direction of the optical waveguide core 112. When light propagating through the optical waveguide core 112 reaches the mirror surface 116A, the light is reflected by a layer adjacent to the mirror surface 116A (mirror layer 118 in this exemplary embodiment), so that the direction of the light propagation is chanced. Although the angle of the mirror surface is described as 45° herein, sufficient optical-path deflecting function is achieved at any angle as long as the deviation from 45° is no more than the critical angle of the waveguide, because the optical-path deflection is performed by a metal reflective layer. For example, when the difference in refractive index between the core and cladding of the optical waveguide is 3%, the critical angle is 23.6°, and therefore a mirror surface having an angle within a range of from 21.4° to 68.6°, which is a range in which the difference from 45° is within the critical angle, can function as a reflective surface having a 90° optical-path deflecting function (a function of changing the direction of the optical path by 90°).

Cladding 114 is formed of a material having a lower refractive index than that of optical cores 112, and is disposed to enclose optical waveguide cores 112.

Each of the material for optical waveguide cores 112 and the material for cladding 114 is not particularly limited as long as the material is transparent at a wavelength used for optical waveguide film 10 and provides a desired difference in refraction index between optical waveguide core 112 and cladding 114. Examples thereof include an alicyclic olefin resin, an acrylic resin, an epoxy resin, and a polyimide resin.

Mirror layer 118 may be formed by a metal layer. The metal layer may include silver or a silver alloy. Silver alloys have been developed that exhibit less change over time than the change that a usual silver exhibits over time, and the silver alloy for the metal layer may be selected from such silver alloys. Examples of such a silver alloy include silver alloys manufactured by Mitsubishi Materials Corporation, such as those sold under the tradenames of Alloy No. 37, Alloy No. 109, and Alloy No. 110.

The thickness of the metal layer disposed as mirror layer 118 may be from 500 nm to 5 µm or from about 500 nm to about 5 µm, and preferably from 500 nm to 2 µm or from about 500 nm to about 2 µm.

Protective layer 120 includes titanium-silver alloy layer (Ti—Ag layer) 120A, titanium layer (Ti layer) 120B, and titanium nitride layer (TiN layer) 120C disposed in this order from the mirror layer 118 side. In the description of the present exemplary embodiment, protective layer 120 is described as having a three-layer structure. However, the structure of protective layer 120 is not limited thereto, and protective layer 120 may be constituted, for example, by titanium layer 120B and titanium nitride layer 120C or by titanium-silver alloy layer 120A and titanium layer 120B. When a thin titanium film is formed on a silver or silver alloy film by a sputtering method, titanium tends to diffuse into the silver or silver alloy to form a titanium-silver alloy. Therefore, there may be no independent "pure titanium layer"; in this case, the presence of an alloy of silver and titanium on the silver surface can be confirmed. In other words, the protective layer may have only titanium-silver alloy layer instead of including a discreet titanium layer. Specifically, for example, the protective layer may be integrated with the reflective layer. Such an integrated structure may be a single film of a complex alloy in which a titanium-silver alloy layer is integrally formed on a silver or silver alloy film. In this structure, the reflective layer and the protective layer are integrated, and the integrated layer is formed by a complex alloy in which a surface of the metal layer (the integrated layer) containing the silver or silver alloy is formed by a titanium-silver alloy.

Protective layer 120 preferably has a total thickness of from 10 nm to 500 nm or from about 10 nm to about 500 nm, more preferably from 10 nm to 200 nm or from about 10 nm to about 200 nm, and still more preferably from 10 nm to 50 nm or from about 10 nm to about 50 nm. Each of the layers constituting protective layer 120 (each of titanium-silver alloy layer 120A, titanium layer 120B, and titanium nitride layer 120C) preferably has a thickness of from 5 nm to 50 nm or from about 5 nm to about 50 nm, and more preferably from 5 nm to 25 nm or from about 5 nm to about 25 nm. By adjusting the thickness to fall within the above range, the deterioration of mirror layer 118 (reflective layer) is prevented while the protective layer is prevented from being excessively thick.

When titanium layer 120B is formed by a sputtering method as described below, the thickness of titanium layer 120B in protective layer 120 refers to the thickness of the layer further including titanium-silver alloy layer 120A since titanium-silver alloy layer 120A is formed at the interface with a lower layer (electric wiring layer or mirror layer 118 formed of silver or a silver alloy) simultaneously with the formation of the titanium layer.

Optical waveguide film 10 may be formed by a flexible transparent resin film. As shown in FIGS. 2A and 2B, optical waveguide film 10 has flexibility (high bending property) when deformed (for example, bent or twisted). Therefore, optical signals transmitted from an optical transmitter and receiver section propagate through an optical waveguide formed in optical waveguide film 10 and are received by another optical transmitter and receiver section even when optical waveguide film 10 is deformed. Optical waveguide film 10 may have such flexibility as to give a minimum bending radius of 3 mm or less. Assuming that a minute portion of a curve formed at the inner side of bent optical waveguide film 10 is approximated to an arc of a circle, the minimum bending radius is a value indicating the minimum radius of the circle. The permissible range thereof is measured by ASTM D-2176, which is incorporated herein by reference.

Optical waveguide film 10 preferably has a thickness of from 50 µm to 500 µm, and more preferably from 50 µm to 200 µm. The width of optical waveguide film 10 is preferably from 0.2 mm to 10 mm, and more preferably from 0.25 mm to 5 mm.

Figure 3A:
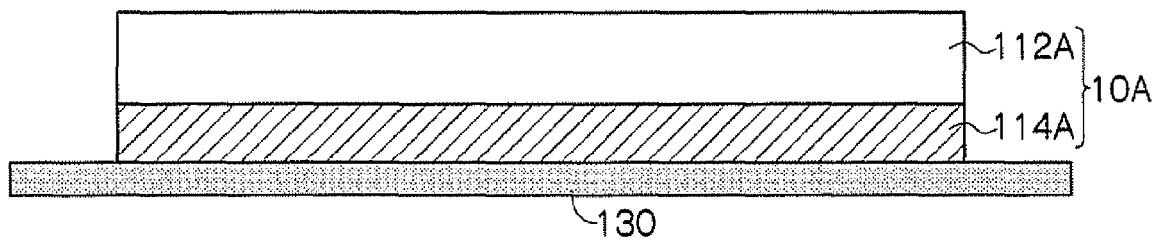
FIGS. 3A to 3C are process charts showing a method for producing an optical waveguide film according to an exemplary embodiment.
Figure 3B:
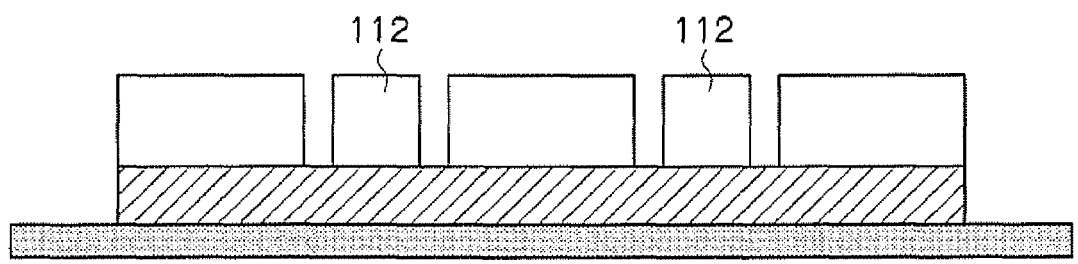
Figure 3C:
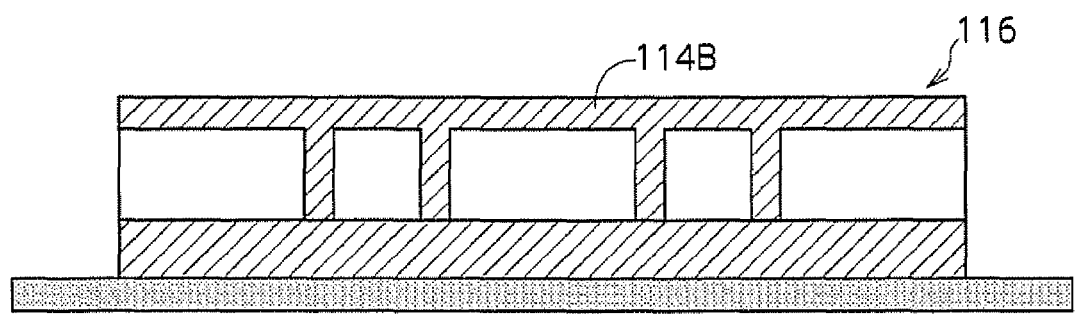

In the following, a method for producing optical waveguide film 10 according to the exemplary embodiment is described. FIGS. 3A to 3C and 4D to 4H are process charts showing a method for producing an optical waveguide film according to an exemplary embodiment. FIGS. 3A to 3C are process charts at a cross section taken along B-B in FIG. 1A, and FIGS. 4D to 4H are process charts at a cross section taken along A-A in FIG. 1A.

In the method for producing optical waveguide film 10 according to the exemplary embodiment, polymer film 10A (laminated material) in which core layer 112A is disposed on cladding layer 114A is prepared as shown in FIG. 3A. The method for providing the respective layers of polymer film 10A is not particularly limited as long as the disposed layers are tightly adhered such that separation between the layers does not occur. A known method may be used, such as a laminating method or a spin coating method.

The material for forming cladding layer 114A is not particularly limited as long as there will be a certain difference in refractive index between the obtained cladding layer 114A and core layer 112A (optical waveguide core 112). The material for forming cladding layer 114A may be selected according to the application, in consideration of, for example, the refractive index, optical characteristics such as optical transmittance, mechanical strength, heat resistance, and flexibility of the material. Examples of the material include radiation-curable resins, electron-beam-curable resins, and thermosetting resins. The material is preferably a UV-curable resin or a thermosetting resin, more preferably a UV-curable or thermosetting monomer, a UV-curable or thermosetting oligomer, or a mixture of the monomer and the oligomer, and still more preferably a UV-curable resin.

Examples of the material for forming cladding layer 114A include epoxy resins, acrylic resins (such as polymethyl methacrylate), alicyclic acrylic resins, styrene resins (such as polystyrene or an acrylonitrile-styrene copolymer), olefin resins (such as polyethylene, polypropylene, or an ethylene-propylene copolymer), alicyclic olefin resins, vinyl chloride resins, vinylidene chloride resins, vinyl alcohol resins, vinyl butyral resins, arylate resins, fluorine-containing resins, polyester resins (such as polyethylene terephthalate or polyethylene naphthalate), polycarbonate resins, cellulose diacetate, cellulose triacetate, amide resins (such as an aliphatic or aromatic polyamide), imide resins, sulfone resins, polyethersulfone resins, polyetheretherketone resins, polyphenylene sulfide resins, polyoxymethylene resins, and blends thereof.

Cladding layer 114A may be provided, for example, (a) by applying dropwise a liquid resin selected from the above materials onto a substrate such as a glass substrate, making the thickness of the liquid resin uniform by spin coating, and curing the resin, or (b) by using an already-formed resin film.

The thickness of cladding layer 114A is not particularly limited, and is preferably from 10 µm to 100 µm, more preferably from 20 µm to 50 µm, in consideration of factors such as optical properties, flexibility, after-mentioned cutting processability, and strength.

The material for forming core layer 112A may be, for example, a UV-curable resin, such as a UV-curable monomer, a UV-curable oligomer, or a mixture of the monomer and the oligomer. Examples of the material for forming a core include epoxy UV-curable resins and acrylic UV-curable resins.

For example, a curable resin for a core (a UV-curable resin) in a liquid state may be applied, in a uniform thickness, to cladding layer 114A, and the resin is cured by irradiation with UV rays using, for example, a UV lamp, a UV-LED, or a UV irradiation apparatus, whereby core layer 112A is formed.

Preferable examples of the material for forming core layer 112A and cladding layer 114A include UV-curable or thermosetting epoxy resins, UV-curable or thermosetting acrylic resins, and UV-curable or thermosetting fluorinated polyamide resins.

The thickness of core layer 112A is not particularly limited, and may be set appropriately in accordance with the use. The thickness of core layer 112A is preferably from 20 µm to 120 µm, and more preferably from 30 µm to 90 µm, in consideration of factors such as optical properties, flexibility, after-mentioned cutting processability, and strength.

The size and total thickness of polymer film 10A are not particularly limited, and may be appropriately set in accordance with the material, use, and the like. For example, in order for optical waveguide film 10 to have flexibility, the thickness of polymer film 10A is preferably from 50 µm to 500 µm, and more preferably from 50 µm to 200 µm. The width of polymer film 10A is preferably from 0.2 mm to 10 nm, and more preferably from 0.25 mm to 5 mm. When the thickness and width of optical waveguide film 10 are set within the above range, flexibility and strength suitable for an optical waveguide can be easily secured.

Thereafter as shown in FIG. 3B, polymer film 10A is cut from the core layer 112A side (i.e., core layer 112A is cut) to form optical waveguide cores 112. The formation of optical waveguide cores 112 can be performed by, for example, cutting polymer film 10A along the longitudinal direction of polymer film 10A with a dicing saw and repeating the cutting with a predetermined spacing in the width direction of polymer film 10A (the spacing will be the width of each optical waveguide core 112). By the cutting, plural optical waveguide cores 112 are formed that are disposed in the same plane on cladding layer 114A and that are parallel to each other, such that a beam of light travels through each core and the respective beams are parallel to each other and separated in the direction of the width of polymer film 10A. In the exemplary embodiment, two optical waveguide cores 112 are formed. In order to perform the cutting with a dicing saw, dicing tape 130 is adhered to polymer film 10A prior to the cutting.

Then, as shown in FIG. 3C, optical waveguide cores 112 are covered with a curable resin for forming cladding. In other words, the curable resin for forming cladding is applied to fill the grooves that have been formed by the cutting, and the resin is cured to form cladding layer 114B. Specifically, for example, a curable resin for cladding is applied dropwise to a surface of polymer film 10A that has been cut, and is spread by a centrifugal force according to a spin coating method, so that the curable resin for cladding is applied on optical waveguide cores 112 and the respective grooves formed by the cutting are filled with the curable resin for cladding; then the resin is cured. The method for applying the curable resin for cladding is not limited to the spin coating method, and may be a method including spreading the curable resin for cladding by pressing a glass substrate against the resin with the thickness of the curable resin controlled by a spacer and exposing the resin to light so as to cure the resin. As a result, cladding 114 (cladding layers 114A and 114B) is formed to enclose optical waveguide cores 112.

The curable resin for forming cladding that is used for forming cladding layer 114B may be a material in a liquid state, and may be, for example, a radiation-curable resin, an electron-beam-curable resin, or a thermosetting resin. Among them, the curable resin is preferably a UV-curable resin or a thermosetting resin, and is more preferably a UV-curable resin. Examples of the UV-curable or thermosetting resin include a UV-curable or thermosetting monomer, a UV-curable or thermosetting oligomer, and a mixture of the monomer and the oligomer. Examples of the UV-curable resin include an epoxy UV-curable resin and an acrylic UV-curable resin. Examples of the thermosetting resin include a polyimide resin and a silicone resin.

Figure 4D:
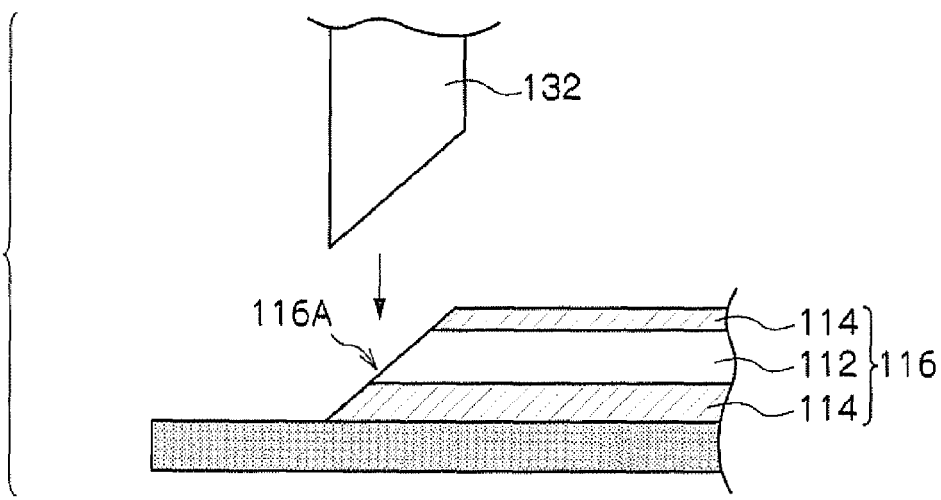
FIGS. 4D to 4H are process charts showing a method for producing an optical waveguide film according to an exemplary embodiment.

Then, as shown in FIG. 4D, both ends of polymer film 10A (optical waveguide film main body 116), in which optical waveguide cores 112 are formed, in the longitudinal direction are cut to form mirror surface 116A (inclined structure) having an angle of, for example, 45° with respect to the longitudinal direction of polymer film 10A at each of the end surfaces of cladding 114 and each of the end surfaces of each optical waveguide core 112. The cutting for making the end surface of cladding 114 and the end surface of each optical waveguide core 112 a mirror surface may be, for example, performed by cutting polymer film 10A with dicing blade 132 having a blade with a 45°-inclined structure at a dicing blade edge so that a surface inclined at 45° to the axial direction of polymer film 10A is formed while the surface opposing the 45°-inclined surface is left perpendicular to the principal surfaces of polymer film 10A. Alternatively, the cutting for making the end surface of cladding 114 and the end surface of each optical waveguide core 112 a mirror surface may be performed by cutting polymer film 10A with dicing blade 132 having a 45°-inclined structure at both sides thereof in the axial direction of polymer film 10A so that opposing surfaces inclined at 45° to the axial direction of polymer film 10A are formed.

The term "principal surface" used herein refers to a surface of polymer film 10A that is perpendicular to the direction in which optical waveguide cores 112 and cladding 114 (cladding layers 114A and 114B) enclosing optical waveguide cores 20 are stacked (i.e., perpendicular to the thickness direction of polymer film 10A). In other words, optical waveguide film main body 116 has a substantially planar appearance having an upper surface and a lower surface, and the upper and lower surfaces are each referred to as a "principal surface" of the optical waveguide film.

Optical waveguide film main body 116 may be prepared as described above.

Figure 4E:
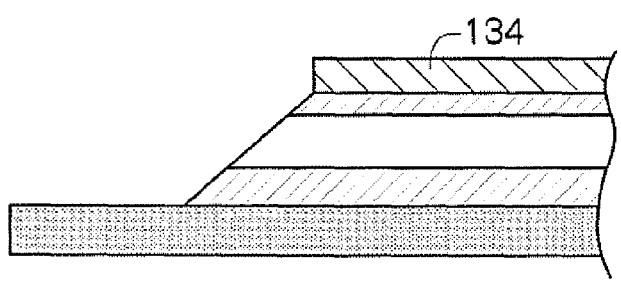

Then, as shown in FIG. 4E, mask 134 (shielding layer) is disposed on a principal surface of polymer film 10A (optical waveguide film main body 116) having optical waveguide cores 112, except on mirror surface 116A. Mask 134 may be, for example, a metal mask (for example, a Ni electroformed metal mask). It is not necessary to accurately dispose mask 134 on a principal surface of polymer film 10A (optical waveguide film main body 116) in which optical waveguide cores 112 are formed; for example, mask 134 may be disposed such that both end portions of the principal surface of polymer film 10A (optical waveguide film main body 116) are exposed. That is to say, the length of mask 134 in the longitudinal direction may be shorter than the length of the longitudinal direction of the principal surface of polymer film 10A (optical waveguide film main body 116), and mirror layer 118 and protective layer 120 may be formed on each end portions of the principal surface in the longitudinal direction, as well as on mirror surface 116A.

Figure 4F:
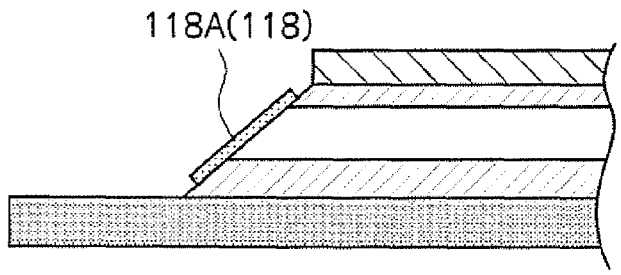

Thereafter, as shown in FIG. 4F, metal layer 118A containing silver or a silver alloy is formed and the layer serves as mirror layer 118. Metal layer 118A may be formed by using, for example, a sputtering method.

Figure 4G:
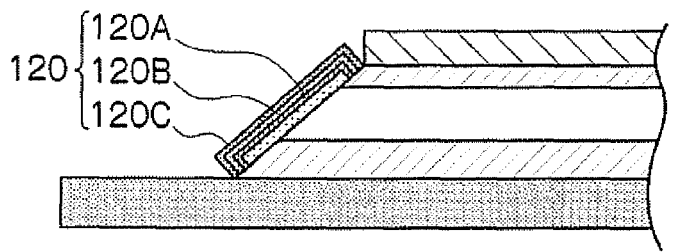

Subsequently, as shown in FIG. 4G, protective layer 120 is formed to cover mirror layer 118 (metal layer 118A) formed on mirror surface 116A. Specifically, titanium-silver alloy layer 120A (Ti—Ag layer), titanium layer 120B (Ti layer), and titanium nitride layer 120C (Ti—N layer) are provided in this order from the mirror layer 118 side. These layers may be formed, for example by a sputtering method.

Specifically, for example according to a sputtering method using titanium as a target, an argon gas is introduced into the apparatus, and discharge within the argon gas is performed to form a titanium layer 120B. When titanium is deposited on metal layer 118A (mirror layer 118) containing silver or a silver alloy by a sputtering method, an alloy of titanium and silver is formed first. Therefore, titanium layer 120B is formed such that titanium-silver alloy layer 120A is provided between titanium layer 120B and metal layer 118A.

Then, according to a sputtering method using titanium as a target, a nitrogen gas is mixed into an argon gas, and the mixed gas is introduced into the apparatus. Discharge within the mixed gas is performed to form titanium nitride layer 120C. When titanium nitride layer 120C is formed by a sputtering method, the characteristics of titanium nitride layer 120C and the constitutional ratio of titanium to nitrogen can be controlled by adjusting the pressure at the time of deposition and by changing the ratio of the flow rate of the argon gas to the flow rate of the nitrogen gas introduced into the apparatus. In particular, the film-forming conditions are preferably such conditions as to provide a titanium nitride layer in gold color, which is the natural color of titanium nitride. However, a titanium nitride layer can function as a protective layer even when it is colored in brown due to a heightened constitutional ratio of nitrogen. Regarding the film-forming conditions to be adopted, for example, the volume ratio (mixing ratio) of nitrogen to argon may be from 5% to 20%. The mixing ratio at which gold color is achieved changes depending on the pressure at deposition. For example, in a typical case, a gold-colored titanium nitride layer is formed at a mixing ratio of 10% at a deposition pressure of 0.3 Pa. Therefore, the control range for the formation of a titanium nitride layer by a sputtering method is broad, so that a desired titanium nitride layer can be obtained easily.

During sequential deposition of mirror layer 118 (metal layer 118A) and protective layer 120 (titanium-silver alloy layer 120A (Ti—Ag layer), titanium layer 120B (Ti layer), and titanium nitride layer 120C (Ti—N layer)) by a sputtering method, an upper layer is deposited to cover the principal surface of the layer just beneath as well as the side surfaces of the layer just beneath.

The formation of metal layer 118A (mirror layer 118) and protective layer 120 (titanium layer 120B (including titanium-silver alloy layer 120A) and titanium nitride layer 120C) by the sputtering method may be conducted using either one or both of the following methods:

(1) a method of performing sputtering without heating polymer film 10A (optical waveguide film main body 116); for example, a heat source (heater) is not provided to a holding member that holds polymer film 10A (workpiece);

(2) a method including sputtering intermittently while changing the sputtering region (the region on which the sputtered substance is to be deposited);—for example, sputtering is conducted while moving the "target" and "polymer film 10A (optical waveguide film main body 116)" relative to each other (for example by rotation).

By using the methods described above, deterioration of (damage to) polymer film 10A (optical waveguide film main body 116) by heating of polymer film 10A (optical waveguide film main body 116) or by radiation heat are suppressed in the sputtering method, and deterioration of the performance of the obtained optical waveguide film 10 is suppressed. The methods are effective in the formation of protective layer 120 (titanium layer 120B (including titanium-silver alloy layer 120A) and titanium nitride layer 120C) since the formation of protective layer 120 is often conducted at a high sputtering temperature.

When the above methods are used, polymer film 10A (optical waveguide film main body 116) is not heated and stress due to radiation heat can be minimized in a sputtering method, so that sputtering can be conducted with dicing tape 130 still adhered to polymer film 10A (optical waveguide film main body 116). Since dicing tape 130 usually has low heat resistance, ingredients of the adhesive are released to the vacuum in a normal sputtering method of heating the material on which a layer is to be formed, so that, for example, the degree of vacuum is lowered. However, when the above-described methods are used, such phenomenon is suppressed. Therefore, in the present exemplary embodiment, sputtering can be conducted while dicing tape 130 adheres to polymer film 10A (optical waveguide film main body 116).

Figure 4H:
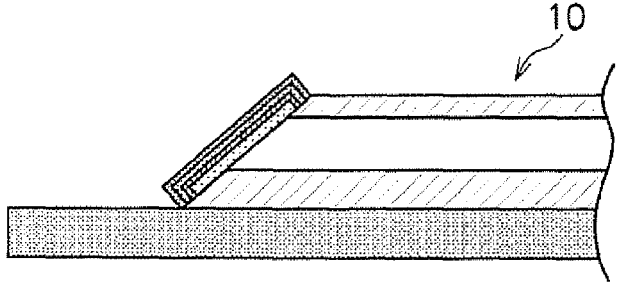

Then, as shown in FIG. 4H, mask 134 is removed, whereby optical waveguide film 10 according to the present embodiment is obtained.

Figure 5A:
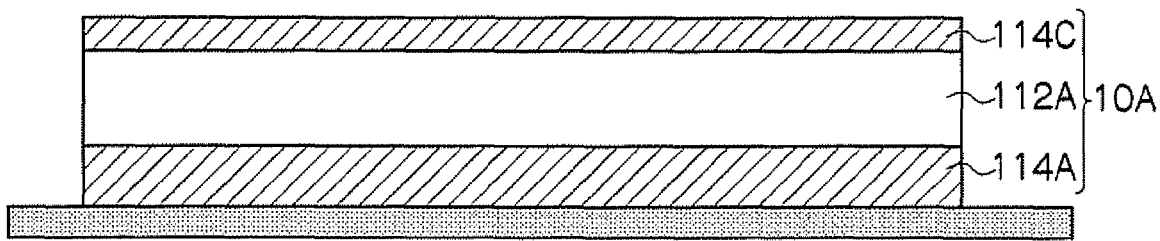
FIGS. 5A to 5C are process charts showing a method for producing a different optical waveguide film main body.
Figure 5B:
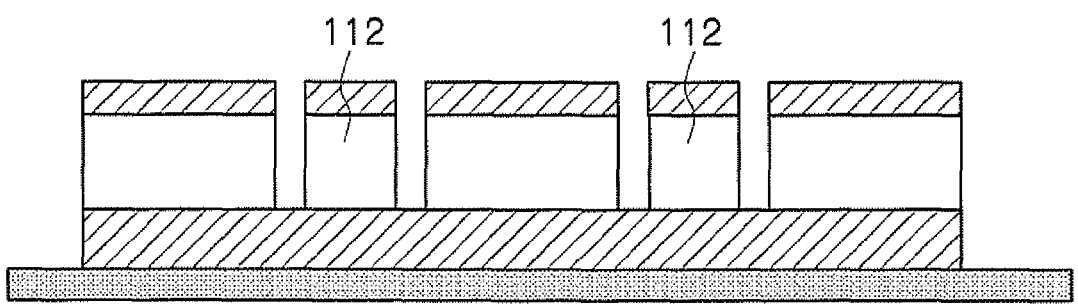
Figure 5C:
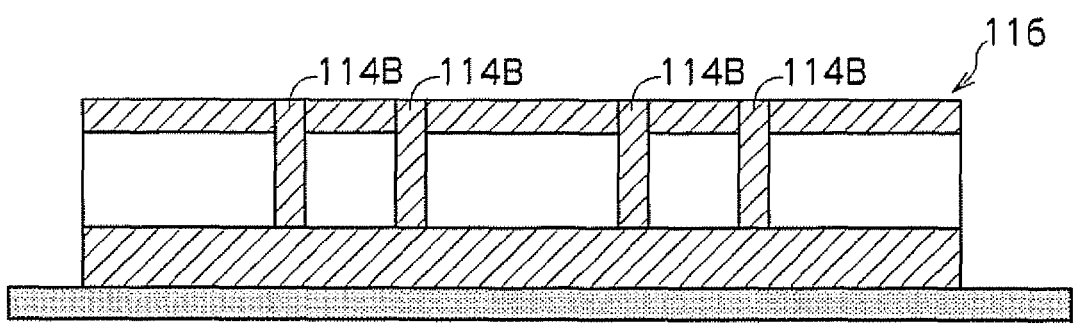

Optical waveguide film main body 116 before the formation of mirror layer 118 and protective layer 120 may be prepared by the method described above or by another method. FIGS. 5A to 5C are process charts indicating another method for producing an optical waveguide film main body. Optical waveguide film main body 116 may be produced by a method using a dicing saw or by another method such as a method including (i) forming a cladding having a hole inside by using a mold and (ii) filling the hole with a resin by suction to form a core.

Specifically, for example, in the method including the processes (i) and (ii), polymer film 10A (laminated body) is prepared in which cladding layer 114A, core layer 112A, and cladding layer 114C are disposed in this order as shown in FIG. 5A. In other words, polymer film 10A is prepared in which core layer 112A is sandwiched between two cladding layers 114A and 114C.

The material for forming cladding layer 114C is not particularly limited as long as a desired difference in refractive index between cladding layer 114C and core layer 112A will be obtained. The material for forming cladding layer 114C is preferably the same material as the material for forming cladding layer 114A. For example, cladding layer 114C may be formed by applying a liquid resin (the same liquid resin as that used for forming cladding layer 114A) to core layer 112A to form a coating with a uniform thickness, and curing the resin.

The thickness of cladding layer 114C is preferably from 5 μm to 100 μm, more preferably from 10 μm to 50 μm, in consideration of the optical characteristics, flexibility, aftermentioned cutting processability, and strength.

The thickness of cladding layer 114A and the thickness of cladding layer 114C are not necessarily the same. For example, the total thickness of polymer film 10A may be made small by setting the thickness of cladding layer 114C to a thickness that is smaller than the thickness of cladding layer 114A.

Then, as shown in FIG. 5B, polymer film 10A is cut from the cladding layer 114C side so as to cut through cladding layer 114C and core layer 112A, whereby optical waveguide cores 112 are formed.

Then, as shown in FIG. 5C, optical waveguide cores 112 are embedded; i.e., a curable resin is applied so as to fill the spaces (grooves formed by the cutting) between plural optical waveguide cores 112 and the resin is cured to form cladding layer 114B. As a result, cladding 114 (cladding layers 114A, 114B, and 114C) is formed to surround optical waveguide cores 112.

Although not shown in the drawings, both ends of polymer film 10A (in which optical waveguide cores 112 are formed) in the longitudinal direction are cut so as to form mirror surface 116A (inclined surface) forming an angle of, for example, 45° with respect to the longitudinal direction of polymer film 10A on each of the both end surfaces of cladding 114 and each of the both end surfaces of each optical waveguide core 112.

Optical waveguide film main body 116 is produced as described above. Thereafter, a mirror layer and protective layer 120 are sequentially formed, thereby providing an optical waveguide film.

In optical waveguide film 10 according to the exemplary embodiment, metal layer 118A containing silver or a silver alloy is disposed as mirror layer 118 (reflective layer). Protective layer 120 including titanium layer 120B is disposed to cover mirror layer 118, so as to protect mirror layer 118 (reflective layer).

The material for forming metal layer 118A disposed at the mirror surface (inclined surface) for deflecting the optical path is preferably silver or a silver alloy in consideration of the reflectivity thereof in the near-infrared range and the cost thereof. However, the silver or silver alloy is vulnerable to oxidation, sulfidation, and chlorination, and is low in durability. Although there are silver alloys obtained by adding various metals to silver, even such alloys deteriorate over time and have insufficient reliability; therefore, it has been necessary to provide a thick resin protective layer. Meanwhile, in consideration of demands for reduction of the thickness of mobile devices, it is preferable to minimize the thickness of the protective layer.

In view of such demands, in the present exemplary embodiment, metal layer 118A containing silver or a silver alloy is used as mirror layer 118 (reflective layer), and protective layer 120 including titanium layer 120B having high durability is used for protecting the mirror layer. Therefore, in the exemplary embodiment, the obtained optical waveguide film 10 includes a reflective layer having reflectance in the near-infrared region and being less vulnerable to deterioration, compared to a case in which other kinds of combination of a reflective layer and a protective layer are used.

In the exemplary embodiment, titanium nitride layer 120C having a lower substance permeability (permeability to, for example, oxygen, sulfur, chlorine) than titanium layer 120B is further provided in protective layer 120. Therefore, deterioration of mirror layer 118 (reflective layer) is further suppressed compared to a case in which titanium layer 120B is used alone as protective layer 120. Further, since titanium nitride layer 120C covers mirror layer 118 (metal layer of silver or a silver alloy) with titanium layer 120B interposed between titanium nitride layer 120C and mirror layer 118, the protective layer more closely adheres to the mirror layer.

In addition, in the exemplary embodiment, titanium-silver alloy layer 120A is contained in protective layer 120 and located between titanium layer 120B and mirror layer 118. Titanium-silver alloy layer 120A includes ingredients of both of titanium layer 120B and mirror layer 118, and titanium layer 120B more closely adheres to mirror layer 118 (reflective layer) due to the presence of titanium-silver alloy layer 120A therebetween. As a result, protective layer 120 more closely adheres to mirror layer 118 (reflective layer).

The material for forming protective layer 120 may be an anti-corrosion metal (such as titanium), an anti-corrosion nitride (such as SiN or TiN), or an anti-corrosion oxide (such as $SiO_2$). In particular, a layer formed of the anti-corrosion metal or the anti-corrosion metal nitride has more uniform properties than those of a layer formed of the metal oxide, thereby having excellent characteristics suitable for various sealing films. However, the anti-corrosion metal or the anti-corrosion metal nitride is formed into a layer generally by CVD (Chemical Vapor Deposition) or PVD (Physical Vapor Deposition) under heating to a temperature within a range of from 500° C. to 600° C. Even when a sputtering method, by which film formation can be performed at lower temperatures, is used, heating to about 200° C. is still necessary at the time of film formation. Therefore, it is difficult to form a layer of the anti-corrosion metal or metal nitride on a polymer film (an optical waveguide film main body) formed of a resin having poor heat resistance.

Specifically, when a sputtering method is used to form titanium layer 120B and titanium nitride layer 120C, the substrate (the material on which a layer is to be formed) is usually heated to a temperature within a range of from about 200° C. to 300° C., so as to improve adhesion property and uniformity of film quality. Therefore, deposition on a polymer film (e.g., an acrylic resin or an epoxy resin) has hitherto hardly ever been performed.

As an exemplary embodiment, titanium layer 120B, titanium nitride layer 120C, and the like are formed by performing sputtering intermittently without heating the substrate (the material on which the layer is to be formed) while changing the sputtering region (the region on which the sputtered substance is to be deposited). The respective layers are analyzed by XRD (X-ray diffraction). In consideration of the ease in attachment to an X-ray diffraction apparatus and in peak detection, a sample obtained by deposition on a glass substrate is used for the analysis by XRD (X-ray diffraction analysis). The sputtering apparatus used is a high-rate sputtering apparatus (SH-450) manufactured by ULVAC Incorporated.

Figure 6:
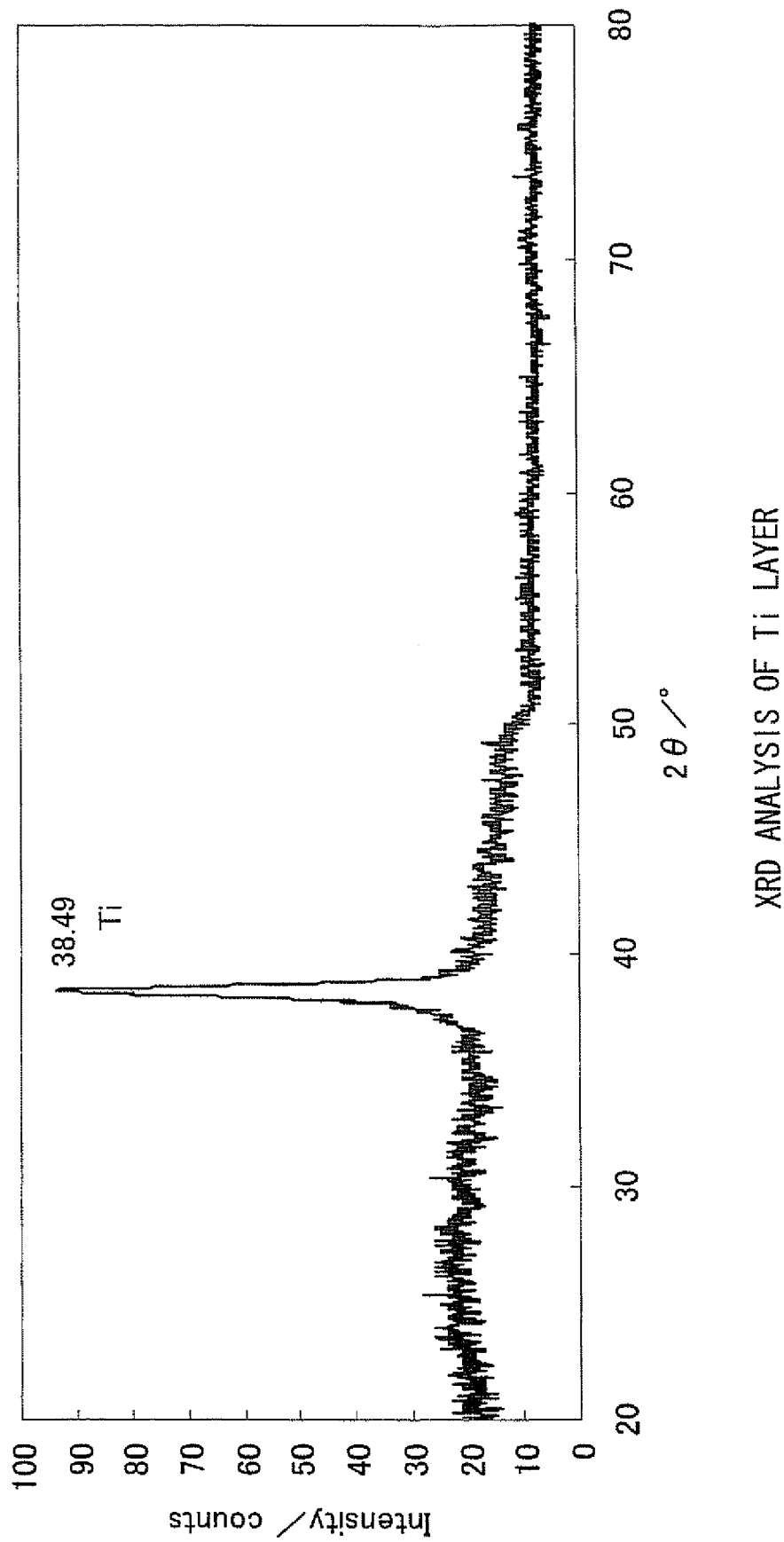
FIG. 6 is a view showing a result of XRD (X-Ray Diffraction) analysis of a sample prepared by depositing a titanium layer by sputtering without heating the material on which the layer is to be formed.

Specifically, titanium (Ti) is deposited on the glass substrate to a thickness of 320 nm by a sputtering method using a titanium (Ti) target at a power of 350 W, a pressure of 0.3 Pa, and a deposition rate of 7 nm/min while introducing an argon (Ar) gas at a flow rate of 20 sccm and moving the glass substrate so as to rotate relative to the target (workpiece rotation rate: 2 revolutions/min) without heating the glass substrate. The result of an XRD (X-ray diffraction) analysis of the obtained titanium layer is shown in FIG. 6. A peak corresponding to titanium (Ti) is observed in FIG. 6, indicating the formation of a titanium layer.

Figure 7:
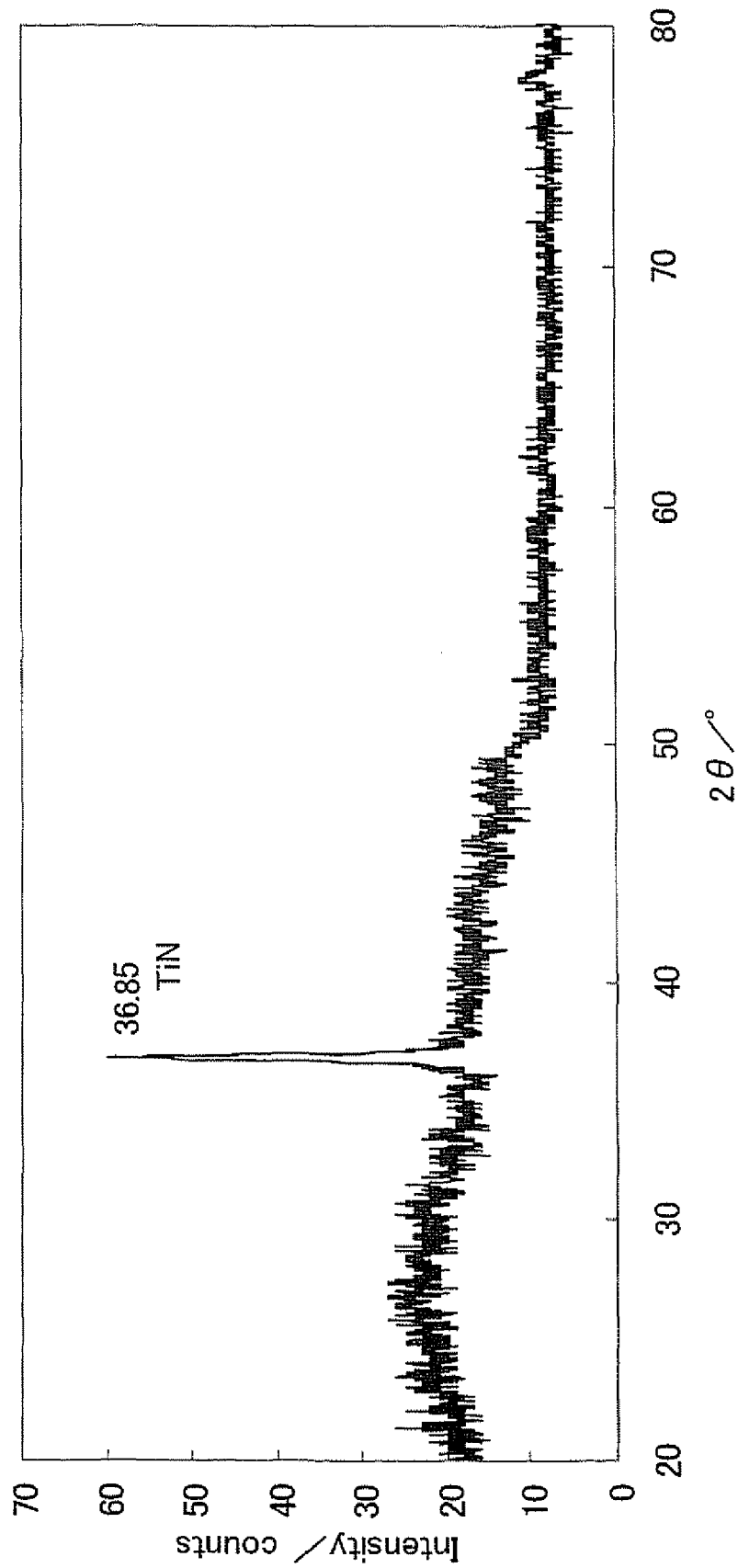
FIG. 7 is a view showing a result of XRD (X-Ray Diffraction) analysis of a sample prepared by depositing a titanium nitride layer by sputtering without heating the material on which the layer is to be formed.

Similarly, titanium nitride (TiN) is deposited on the glass substrate to a thickness of 236 nm by a sputtering method using a titanium (Ti) target at a power of 350 W, a pressure of 0.3 Pa, and a deposition rate of 2.8 nm/min while introducing an argon (Ar) gas at a flow rate of 18 sccm and a nitrogen ($N_2$) gas at a flow rate of 2 sccm and moving the glass substrate so as to rotate relative to the target (workpiece rotation rate: 2 revolutions/min) without heating the glass substrate, the rate of the argon gas flow rate to the nitrogen gas flow rate being 9:1. The result of an XRD (X-ray diffraction) analysis of the obtained titanium nitride layer is shown in FIG. 7. The peak at a 2θ value corresponding to Ti observed in FIG. 6 is not observed in FIG. 7, while a peak corresponding to TiN is observed in FIG. 7, indicating the formation of a titanium nitride (TiN) layer.

Figure 8:
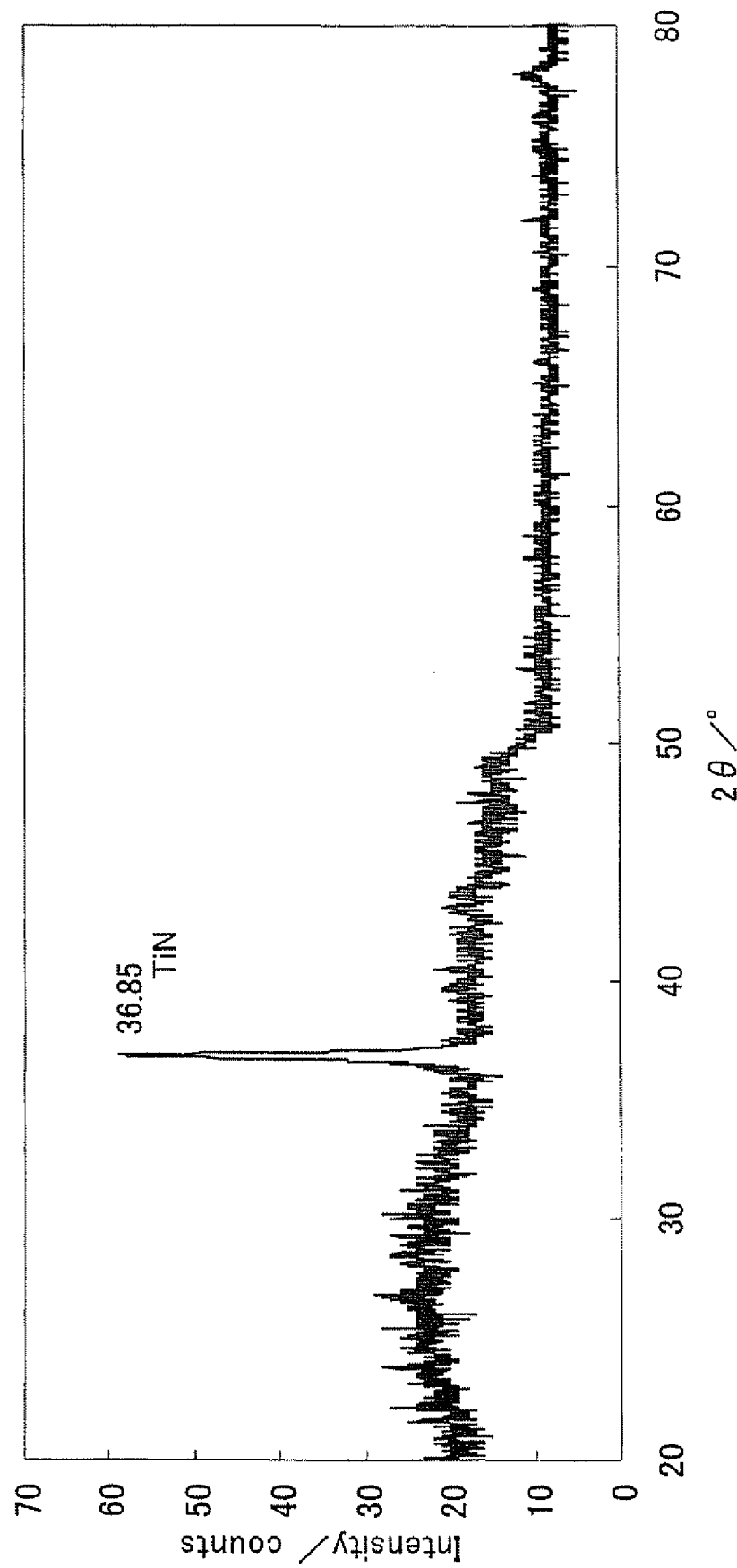
FIG. 8 is a view showing a result of XRD (X-Ray Diffraction) analysis of a sample prepared by depositing a titanium nitride layer by sputtering while heating the material on which the layer is to be formed.

For comparison, titanium nitride (TiN) is deposited on the glass substrate to a thickness of 236 nm by a sputtering method in the same manner as described above, except that, during the deposition, the glass substrate is not rotated (the workpiece is not rotated) and the glass substrate is heated at a temperature of 200° C. The result of an XRD (X-ray diffraction) analysis of the obtained titanium nitride layer is shown in FIG. 8. As in FIG. 7, the peak corresponding to TiN is observed in FIG. 8, indicating that a titanium nitride (TiN) layer is formed that has hardly any film property difference from the titanium nitride (TiN) layer obtained by deposition in which the glass substrate is not heated.

Figure 9:
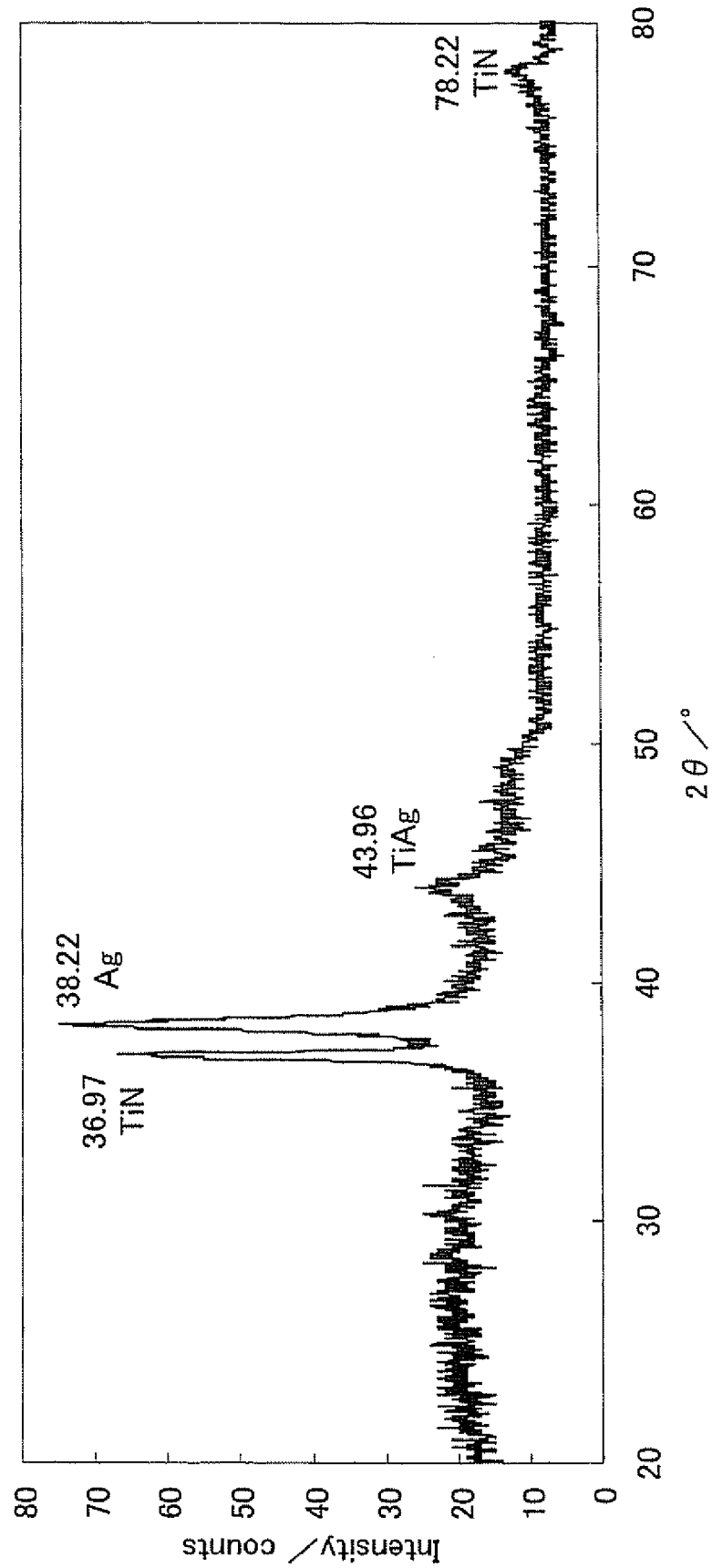
FIG. 9 is a view showing results of XRD (X-Ray Diffraction) analysis of a sample prepared by sequentially depositing a silver alloy layer, a titanium layer, and a titanium nitride layer by sputtering without heating the material on which the layers are to be formed.

In addition, a silver alloy (silver alloy No. 37 manufactured by Mitsubishi Materials Corporation) is deposited on the glass substrate to a thickness of 100 nm by a sputtering method using a target formed of the silver alloy without heating the glass substrate, while moving the glass substrate so as to rotate relative to the target (workpiece rotation rate: 2 revolutions/min). Then, titanium (Ti) is deposited on the glass substrate to a thickness of 20 nm by a sputtering method using a titanium (Ti) target at a power of 350 W, a pressure of 0.3 Pa, and a deposition rate of 7 nm/min while introducing an argon (Ar) gas at a flow rate of 20 sccm and rotating the glass substrate in the manner described above without heating the class substrate. Then, titanium nitride (TiN) is deposited on the titanium layer to a thickness of 236 nm by introducing an argon (Ar) gas at a flow rate of 18 sccm and a nitrogen ($N_2$) gas at a flow rate of 2 sccm, the rate of the argon gas flow rate to the nitrogen gas flow rate being 9:1. The result of an XRD (X-ray diffraction) analysis of the obtained layers is shown in FIG. 9. A peak corresponding to a titanium-silver alloy (Ti—Ag) is observed in FIG. 9, together with the respective peaks corresponding to the silver alloy, titanium, and titanium nitride. Therefore, it is found that a titanium-silver alloy layer is disposed between the silver alloy layer and the titanium layer.

As described above, in the present exemplary embodiment, specific methods (such as the above methods (1) and (2)) may be used in sputtering to suppress deterioration (damaging) of polymer film 10A (optical waveguide film main body 116) due to heating of polymer film 10A (optical waveguide film main body 116) or radiation heat. In other words, protective layer 120 may be formed by a sputtering method while suppressing the film deterioration caused by heat. Consequently, in the exemplary embodiment, mirror layer 118 and protective layer 120 having the specific layer configuration can be formed while suppressing the deterioration of optical waveguide film 10 caused by heat.

Optical Transmitter and Receiver Module

Figure 10:
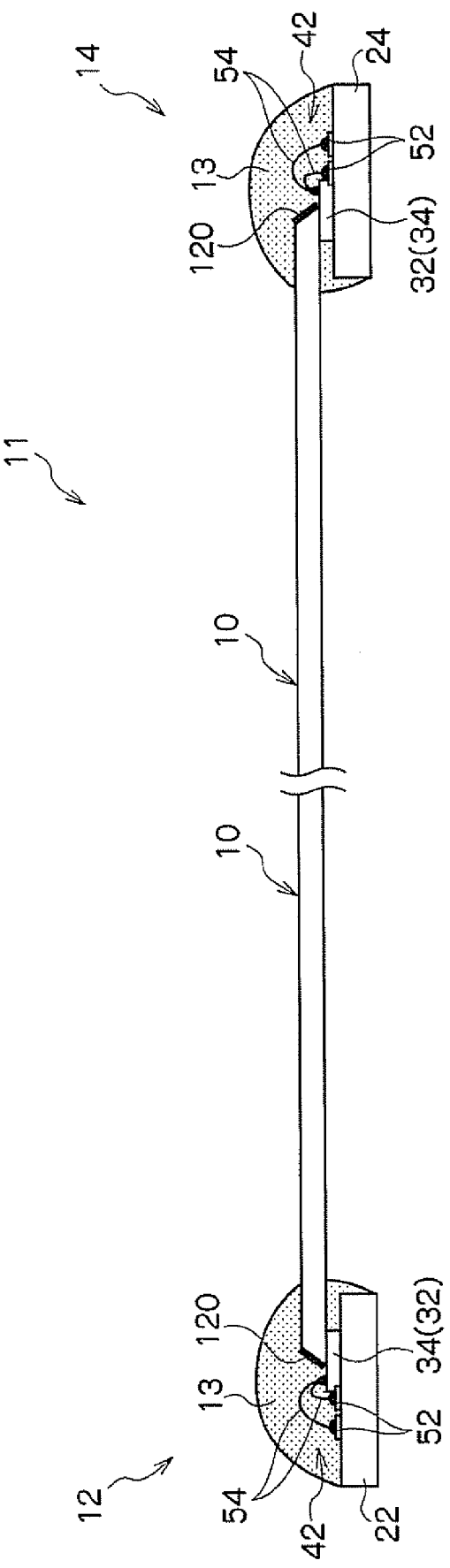
FIG. 10 is a schematic side view of an optical transmitter and receiver module according to an exemplary embodiment.
Figure 11:
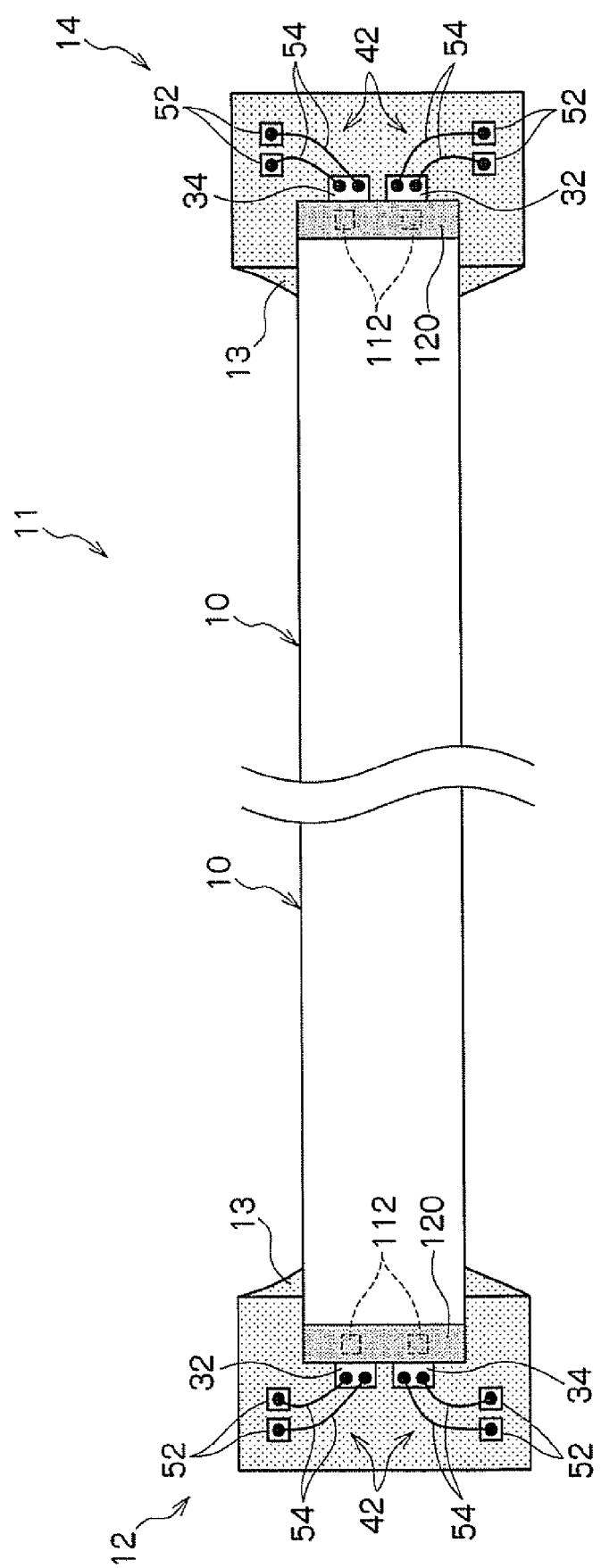
FIG. 11 is a schematic side view of an optical transmitter and receiver module according to another exemplary embodiment.

FIG. 10 is a schematic side view of an optical transmitter and receiver module according to an exemplary embodiment. FIG. 11 is a schematic plan view of an optical transmitter and receiver module according to an exemplary embodiment. Optical transmitter and receiver module 11 according to the present exemplary embodiment includes, as shown in FIGS. 10 and 11, belt-shaped optical waveguide film 10 and optical transmitter and receiver sections 12 and 14 that transmit and receive optical signals via an optical waveguide formed in optical waveguide film 10. As the optical waveguide film 10, the optical waveguide film 10 according to the aforementioned exemplary embodiments is applied.

Optical transmitter and receiver section 12 includes holding member 22, and one end portion of optical waveguide film 10 is held on holding member 22. Optical transmitter and receiver section 14 includes holding member 24, and the other end portion of optical waveguide film 10 is held on holding member 24.

Holding member 22 and holding member 24 are each provided with light-receiving element 34, light-emitting element 32, wire connecting section 42 for transmitting and receiving a signal by the light-receiving and light-emitting elements. Although not illustrated in the drawings, at least one of a driving circuit for light-receiving element 34 and light-emitting element 32 or an amplification circuit for light-receiving element 34 and light-emitting element 32 may also be provided.

At each wire connecting section 42 for performing transmission and reception of a signal by the light-receiving and light-emitting elements, light-receiving element 34 and light-emitting element 32 are connected by wires 54 to electrodes 52 provided at each of holding member 22 and 24 (in the present exemplary embodiment, two electrodes 52 are provided at each holding member), in order to allow, from outside of the module, amplification of a signal transmitted and received by the light-receiving and light-emitting elements and driving of the light-receiving and light-emitting elements.

In optical transmitter and receiver module 11, a terminal portion of optical waveguide film 10 and light-receiving element 34, light-emitting element 32, and wire connecting section 42 provided at each of holding members 22 and 24 are covered and sealed by sealing resin 13. The sealing resin is not particularly limited, and may be, for example, a flame-retardant resin showing a flame retardancy of HB or higher in a UL94 test.

Next, the structure of optical transmitter and receiver section 12 having holding member 22 will be described. Since holding member 24 has the same structure as that of holding member 22 and optical transmitter and receiver section 14 has the same structure as that of optical transmitter and receiver section 12, descriptions of holding member 24 and optical transmitter and receiver section 14 are omitted.

Holding member 22 is formed of a substrate that is substantially a rectangular parallelepiped. Holding member 22 is provided with light-receiving element 34, light-emitting element 32, and wire connecting section 42.

In the exemplary embodiment, an optical waveguide used to transmit an optical signal from optical transmitter and receiver section 12 is called an optical waveguide for transmission of the signal, and an optical waveguide used to receive an optical signal from optical transmitter and receiver section 12 is called an optical waveguide for receiving the signal. However, when these optical waveguides are considered in terms of the function of optical transmitter and receiver section 14, the optical waveguide for transmission of the signal and the optical waveguide for receiving the signal are reversed.

In optical transmitter and receiver section 12, for example, light-emitting element 32 and light-receiving element 34 are mounted on holding member 22 by using a flip chip bonder or the like. Next, optical waveguide film 10 is mounted on light-emitting element 32 and light-receiving element 34 by using a flip chip bonder. As a result, optical waveguide film 10 is held by holding member 22 (and holding member 24). Then, light-emitting element 32 and light-receiving element 34 are connected to electrodes 52 by wires 54.

Further, the surfaces of light-emitting element 32, light-receiving element 34, wire connecting section 42, and optical waveguide film 10, which are mounted or held on each of holding member 22 and holding member 24, are coated with sealing resin 13 by using a dispenser, whereby sealing resin layer 13 is provided on the surfaces of these members. The coating using a dispenser may be carried out by putting a module in a mold having a depression.

Through the aforementioned process, optical transmitter and receiver module 11 of the present exemplary embodiment in which the surfaces of light-emitting element 32, light-receiving element 34, wire connecting section 42, and optical waveguide film 10 as components of optical transmitter and receiver module 11 are coated with sealing resin 13, is prepared.

Next, an operation of optical transmitter and receiver module 11 according to the exemplary embodiment will be described. In the description given herein, an optical waveguide for transmission of an optical signal refers to an optical waveguide to which optical transmitter and receiver section 12 transmits an optical signal, and an optical waveguide for receiving an optical signal refers to an optical waveguide from which optical transmitter and receiver section 12 receives an optical signal.

In the optical transmitter and receiver module according to the exemplary embodiment, when an optical signal is transmitted from optical transmitter and receiver section 12 to optical transmitter and receiver section 14, light emitted from light-emitting element 32 held by holding member 22 of optical transmitter and receiver section 12 enters an optical waveguide core 112 of the optical waveguide for transmission of the signal from an incident end surface of the optical waveguide core 112, and is transmitted through the optical waveguide for transmission of the signal formed in optical waveguide film 10; the light coming out of the outputting end surface of the optical waveguide core 112 of the optical waveguide for transmission is received by light-receiving element 34 held by holding member 24 of optical transmitter and receiver section 14.

Similarly, when an optical signal transmitted from optical transmitter and receiver section 14 is received by optical transmitter and receiver section 12, light emitted from light-emitting element 32 held by holding member 24 of optical transmitter and receiver section 14 enters an optical waveguide core 112 of the optical waveguide for receiving the signal from an incident end surface (mirror surface 116A) of the optical waveguide core 112, and is transmitted through the optical waveguide for receiving the signal formed in optical waveguide film 10. Then, the light coming out of the outputting end surface (mirror surface 116A) of the optical waveguide core 112 of the optical waveguide for receiving the signal is received by light-receiving element 34 held by holding member 22 of optical transmitter and receiver section 12.

In the aforementioned exemplary embodiment, a description was given of an optical transmitter and receiver module that conducts two-way optical communication between the optical transmitter and receiver sections each having both of a light-emitting element and a light-receiving element mounted thereon. However, the module may alternatively be an optical transmitter and receiver module in which one-way optical communication is carried out between an optical transmitter section having a light-emitting element and an optical receiver section having a light-receiving element.

The foregoing description of the exemplary embodiments of the present invention has been provided for the purposes of illustration and description. It is not intended to be exhaustive or to limit the invention to the precise forms disclosed. Obviously, many modifications and variations will be apparent to persons skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

EXAMPLES

The present invention is described specifically below by way of examples. However, the examples should not be construed as limiting the invention.

Example 1

A thick-layer resist (SU-8 (tradename) manufacture by Kayaku Microchem Co., Ltd.) is applied to a Si substrate by a spin coating method, prebaked at 80° C., exposed to light through a photomask, and developed to form, on the Si substrate, a two protruding portions each having a width of 50 μm, a height of 50 μm, and a length of 80 mm and each having a square cross section. The spacing between the two protruding portions is set to 250 μm. Then, the obtained material is post-baked at 120° C. to provide a master plate for producing an optical waveguide film.

Then, a release agent is applied to the master plate. Then, a mixture of a thermosetting liquid dimethylsiloxane rubber (SYLGARD184 (tradename) manufactured by Dow Coming Asia Ltd. and having a viscosity of 5,000 mPa·s) and a curing agent for the rubber is poured onto the master plate, and cured by heating at 120° C. for 30 minutes, and the resultant product is peeled to provide a mold having recess portions corresponding to the protruding portions whose cross sections are rectangular. The thickness of the mold is 5 mm.

Thereafter, a through hole having a tapered cross section in the thickness direction of the mold is formed by blanking at each end of the recess portions such that the holes formed at the ends of a recess portion are indirectly connected to each other via the recess portion. Thus, a through hole is formed in the mold, the mold having a circular shape when viewed from the above. In this way, a template is obtained.

The template is brought into tight contact with a film substrate for cladding (ARTON film (tradename) manufactured by JSR Corporation and having a refractive index of 1.510) having a thickness of 20 μm and being somewhat larger than the template. Subsequently, a few drops of a UV-curable resin having a viscosity of 500 mPa·s are given to the inlet of the through hole of the template, and vacuum suction is performed from the outlet (vacuum suction port) of the through hole, so that the UV-curable resin is filled into the recess portions in ten minutes. Then, UV light at an intensity of 50 mW/cm$^2$ is irradiated from above the template for five minutes to cure the UV-curable resin. When the template is peeled from the ARTON film, cores having the same shape as that of the protruding portions on the master plate are formed on the ARTON film.

Next, a UV-curable resin that will give a post-curing refractive index (1.510), which is the same as that of the ARTON film, is applied to the surface of the ARTON film on which the cores have been formed. Then, a film substrate for cladding having a thickness of 20 μm is attached thereto. The UV-curable resin is cured by irradiation with UV rays at an intensity of 50 mW/cm$^2$ for 5 minutes, so that the two films are adhered to each other. In this way, a belt-shaped optical waveguide film having a width of 1.5 mm and a thickness of 100 μm is obtained.

Then, a dicing saw having a 45°-angled dicing blade is used to cut the both ends of the optical waveguide film at an angle of 45° with respect to the optical axis, so that an optical waveguide film main body, in which an inclined surface (mirror surface) at an inclination angle of 45° is formed at each end thereof, is obtained.

Thereafter, sputtering using a silver alloy target (Ag alloy No. 37 manufactured by Mitsubishi Materials Corporation) is performed while the optical waveguide film main body is still attached to a dicing tape, so that a silver alloy layer having a thickness of 100 nm is formed on the 45°-inclined surface. Specifically, in the sputtering, a high-rate sputtering apparatus (SH-450 (tradename) manufactured by ULVAC Incorporated) is used to deposit the silver alloy for 180 seconds at a power of 0.35 kW, an argon gas flow rate of 15 sccm, and a deposition pressure of 0.25 Pa while the workpiece (optical waveguide film main body) is rotated at 2 revolutions/minute without being heated, whereby the silver alloy layer (mirror layer) having a thickness of 100 nm is deposited on the inclined surface of the optical waveguide film main body.

Thereafter, in the high-rate sputtering apparatus (SH-450) manufactured by ULVAC Incorporated, the silver alloy target is replaced by a titanium (Ti) target to perform sputtering so as to sequentially form a titanium (Ti) layer and a titanium nitride (TiN) layer, which serve as a protective layer.

Specifically, the formation of the Ti layer is conducted as follows: deposition is performed for 90 seconds at a power of 0.35 kW, an argon gas flow rate of 20 sccm, and a deposition pressure of 0.30 Pa while the workpiece (optical waveguide film main body) is rotated at a rate of 2 revolutions/minute without being heated, so as to form a Ti layer having a thickness of 10 nm that covers the silver alloy layer (mirror layer) of the optical waveguide film main body.

The formation of the TiN layer is conducted as follows: deposition is performed for 210 seconds using the same Ti target as above at a power of 0.35 kW, an argon gas flow rate of 18 sccm, a nitrogen gas flow rate of 2 sccm, and a deposition pressure of 0.30 Pa while the workpiece (optical waveguide film main body) is rotated at a rate of 2 revolutions/minute without being heated, so as to form a TiN layer having a thickness of 10 nm that covers the Ti layer on the optical waveguide film main body.

Since the high-rate sputtering apparatus (SH-450) manufactured by ULVAC Incorporated can accommodate four kinds of targets, the above three layers are formed in a series of operations without being exposed to the outside atmospheric air during the operations.

It is confirmed by an XRD (X-ray diffraction) analysis that the Ti layer has reacted with the silver alloy layer to form a titanium-silver alloy layer.

Finally, the optical waveguide film main body having the deposited layers thereon is peeled from the dicing tape, so that an optical waveguide film is obtained which has a mirror layer covered by a protective layer and formed on an inclined surface (mirror surface); the inclined surface is a 90° optical-path deflecting portion (a portion at which the direction of the optical path is changed by 90 degrees).

Evaluation

A light from a LED light source having a wavelength of 850 nm is introduced into the optical waveguide via a multi-mode fiber having a core diameter of 50 μm, and the light leaving the optical waveguide is transmitted through a polymer cladding fiber having a core diameter of 200 μm and detected by a photo-diode, so as to calculate the insertion loss of the light and so as to evaluate the properties of the mirror layer. The calculated reflection loss is 0.3 dB, indicating excellent properties of the mirror layer. In order to evaluate long-term reliability, an accelerated test on the long-term reliability is performed by immersing the obtained optical waveguide film in a 5% by weight saline water for 24 hours; as a result, changes such as whitening due to chlorination are not at all observed at the mirror layer, indicating high long-term reliability. For the purpose of comparison, a sample having only the silver alloy layer (mirror layer) without the Ti/TiN layer is prepared and evaluated; as a result complete whitening is observed and the reflectance is greatly decreased in this sample.

Example 2

First, an epoxy film having high refractive index (thickness: 50 μm, refractive index: 1.57) for forming a core is prepared. Then, an epoxy UV-curable resin having a refractive index of 1.51 is applied, in a thickness of 20 μm, to both surfaces of the epoxy film by spin coating, and is cured by irradiation with UV rays, thereby providing a three-layered film.

Then, the three-layered film is attached to a dicing saw (DAD321 (tradename) manufactured by DISCO Corporation), and is cut with the dicing saw equipped with a 100 μm-thick blade from the principal surface (the top surface) side at an accuracy of 75 μm±5 μm. Then, the cutting position is shifted by 50 μm in the width direction, and cutting is performed again. As a result, groove portions are formed that flank a core having a 50 μm-square section. Thereafter, the cutting position is shifted by 1.1 mm in the width direction, and cutting is performed again. Further, the cutting position is shifted by 50 μm in the width direction, and cutting is performed again. In this way, two cores, each having a 50 μm-square section, are formed at a pitch of 1.1 mm.

Thereafter, an epoxy UV-curable resin having a refractive index of 1.51 is applied to fill the grooves formed by the cutting. Then, UV rays are irradiated to cure the resin, thereby providing a belt-shaped optical waveguide film having a width of 1.0 mm and a thickness of 90 µm.

Then, a dicing saw having a 45°-angled blade is used to cut the both ends of the optical waveguide film at an angle of 45° with respect to the optical axis, whereby a 45°-mirror surface is formed at each end and the cores are exposed at the mirror surface. In this way, an optical waveguide film main body is obtained in which inclined surface (mirror surface) at an inclination angle of 45° is formed at each end thereof.

Thereafter, sputtering using a silver alloy target (Ag alloy No. 37 manufactured by Mitsubishi Materials Corporation) is performed while the optical waveguide film main body is still attached to a dicing tape, so that a silver alloy layer having a thickness of 100 nm is formed on the 45°-inclined surface. Specifically, in the sputtering, a high-rate sputtering apparatus (SH-450 (tradename) manufactured by ULVAC Incorporated) is used to deposit the silver alloy for 180 seconds at a power of 0.35 kW, an argon as flow rate of 15 sccm, and a deposition pressure of 0.25 Pa while the workpiece (optical waveguide film main body) is rotated at 2 revolutions/minute without being heated, whereby the silver alloy layer (mirror layer) having a thickness of 100 nm is deposited on the inclined surface of the optical waveguide film main body.

Thereafter, in the high-rate sputtering apparatus (SHI-450) manufactured by ULVAC Incorporated, the silver alloy target is replaced by a titanium (Ti) target to perform sputtering so as to sequentially form a titanium (Ti) layer and a titanium nitride (TiN) layer, which serve as a protective layer.

Specifically, the formation of the Ti layer is conducted as follows: deposition is performed for 90 seconds at a power of 0.35 kW, an argon gas flow rate of 20 sccm, and a deposition pressure of 0.30 Pa while the workpiece (optical waveguide film main body) is rotated at a rate of 2 revolutions/minute without being heated, so as to form a Ti layer having a thickness of 10 nm that covers the silver alloy layer (mirror layer) of the optical waveguide film main body.

The formation of the TiN layer is conducted as follows: deposition is performed for 210 seconds using the same Ti target as above at a power of 0.35 kW, an argon gas flow rate of 18 sccm, a nitrogen gas flow rate of 2 sccm, and a deposition pressure of 0.30 Pa while the workpiece (optical waveguide film main body) is rotated at a rate of 2 revolutions/minute without being heated, so as to form a TiN layer having a thickness of 10 nm that covers the Ti layer on the optical waveguide film main body.

Since the high-rate sputtering apparatus (SH-450) manufactured by ULVAC Incorporated can accommodate four kinds of targets, the above three layers are formed in a series of operations without being exposed to the outside atmospheric air during the operations.

It is confirmed by an XRD (X-ray diffraction) analysis that the Ti layer has reacted with the silver alloy layer to form a titanium-silver alloy layer.

Finally, the optical waveguide film main body having the deposited layers thereon is peeled from the dicing tape, so that an optical waveguide film is obtained which has a mirror layer covered by a protective layer and formed on an inclined surface (mirror surface); the inclined surface is a 90° optical-path deflecting portion (a portion at which the direction of the optical path is changed by 90 degrees).

Evaluation

The properties of the mirror layer are evaluated in the same manner as in Example 1. The observed reflection loss is 0.3 dB, indicating excellent properties of the mirror layer. In order to evaluate long-term reliability, an accelerated test on the long-term reliability is performed by immersing the obtained optical waveguide film in a 5% by weight saline water for 24 hours; as a result, changes such as whitening due to chlorination are not at all observed at the mirror layer, indicating high long-term reliability. For the purpose of comparison, a sample having only the silver alloy layer (mirror layer) without the Ti/TiN layer is prepared and evaluated; as a result complete whitening is observed and the reflectance is greatly decreased in this sample.

Example 3

Application of an epoxy resin by spin coating for layer formation is repeated to form an epoxy-based three-layered film in which a low-refractive-index layer (thickness: 20 µm, refractive index: 1.51), a high-refractive-index layer (thickness: 50 µm, refractive index: 1.57), and a low-refractive-index layer (thickness: 20 µm, refractive index: 1.51) are disposed in this order.

Then, the three-layered film is attached to a dicing saw (DAD321 (tradename) manufactured by DISCO Corporation), and is cut with the dicing saw equipped with a 100 µm-thick blade from the principal surface (the top surface) side at an accuracy of 75 µm±5 µm. Then, the cutting position is shifted by 50 µm in the width direction, and cutting is performed again. As a result, groove portions by which a core having a 50 µm-square section is flanked are formed. Thereafter, the cutting position is shifted by 1.1 mm in the width direction, and cutting is performed again. Further, the cutting position is shifted by 50 µm in the width direction, and cutting is performed again. In this way, two cores each having a 50 µm-square section are formed at a pitch of 1.1 mm.

Thereafter, an epoxy UV-curable resin having a refractive index of 1.51 is applied to fill the grooves formed by the cutting. Then, UV rays are irradiated to cure the resin, thereby providing a belt-shaped optical waveguide film having a width of 1.0 mm and a thickness of 90 µm.

Then, a dicing saw having a 45°-angled blade is used to cut the both ends of the optical waveguide film at an angle of 45° with respect to the optical axis, whereby a 45°-mirror surface is formed at each end and the cores are exposed at the mirror surface. In this way, an optical waveguide film main body is obtained in which an inclined surface (mirror surface) at an inclination angle of 45° is formed at each end thereof.

Thereafter, sputtering using a silver alloy target (Ag alloy No. 37 manufactured by Mitsubishi Materials Corporation) is performed while the optical waveguide film main body is still attached to a dicing tape, so that a silver alloy layer having a thickness of 100 nm is formed on the 45°-inclined surface. Specifically, in the sputtering, a high-rate sputtering apparatus (SH-450 (tradename) manufactured by ULVAC Incorporated) is used to deposit the silver alloy for 180 seconds at a power of 0.35 kW, an argon gas flow rate of 15 sccm, and a deposition pressure of 0.25 Pa while the workpiece (optical waveguide film main body) is rotated at 2 revolutions/minute without being heated, whereby the silver alloy layer (mirror layer) having a thickness of 100 nm is deposited on the inclined surface of the optical waveguide film main body.

Thereafter, in the high-rate sputtering apparatus (SH-450) manufactured by ULVAC Incorporated, the silver alloy target is replaced by a titanium (Ti) target to perform sputtering so as to form a titanium (Ti) layer, which serves as a protective layer.

Specifically, the formation of the Ti layer is conducted as follows: deposition is performed for 90 seconds at a power of 0.35 kW, an argon gas flow rate of 20 sccm, and a deposition pressure of 0.30 Pa while the workpiece (optical waveguide film main body) is rotated at a rate of 2 revolutions/minute without being heated, so as to form a Ti layer having a thickness of 10 nm that covers the silver alloy layer (mirror layer) of the optical waveguide film main body.

Since the high-rate sputtering apparatus (SH-450) manufactured by ULVAC Incorporated can accommodate four kinds of targets, the above two layers are formed in a series of operations without being exposed to the outside atmospheric air during the operations.

It is confirmed by an XRD (X-ray diffraction) analysis that the Ti layer has reacted with the silver alloy layer to form a titanium-silver alloy layer.

Finally, the optical waveguide film main body having the deposited layers thereon is peeled from the dicing tape, so that an optical waveguide film is obtained which has a mirror layer covered by a protective layer and formed on an inclined surface (mirror surface); the inclined surface is a 90° optical-path deflecting portion (a portion at which the direction of the optical path is changed by 90 degrees).

Evaluation

The properties of the mirror layer are evaluated in the same manner as in Example 1. The observed reflection loss is 0.3 dB, indicating excellent properties of the mirror layer. In order to evaluate long-term reliability, an accelerated test on the long-term reliability is performed by immersing the obtained optical waveguide film in a 5% by weight saline water for 24 hours; as a result, changes such as whitening due to chlorination are not at all observed at the mirror layer, indicating high long-term reliability. However, when the immersion time in the saline water is elongated to 36 hours in the accelerated test on long-term reliability, whitening due to chlorination is slightly observed at the mirror layer. It is thus found that the single layer of Ti can serve as a protective layer for protecting the silver alloy layer (mirror layer) even though the durability thereof is inferior to that of the protective layer in which the Ti layer and the TiN layer are both included. For the purpose of comparison, a sample having only the silver alloy layer (mirror layer) without the Ti layer is prepared and evaluated; as a result complete whitening is observed and the reflectance is greatly decreased in this sample.

Example 4

Application of an acrylic resin by spin coating for layer formation is repeated to form an acrylic three-layered film in which a low-refractive-index layer (thickness: 20 µm, refractive index: 1.51), a high-refractive-index layer (thickness: 50 µm, refractive index: 1.57), and a low-refractive-index layer (thickness: 20 µm, refractive index: 1.51) are disposed in this order.

Then, an optical waveguide film main body in which an inclined surface (mirror surface) at an inclination angle of 45° is formed at each end thereof is prepared in the same manner as in Example 3, except that the epoxy-based three-layered film is replaced by the acrylic three-layered film.

Thereafter, sputtering using a silver alloy target (Ag alloy No. 37 manufactured by Mitsubishi Materials Corporation) is performed while the optical waveguide film main body is still attached to a dicing tape, so that a silver alloy layer having a thickness of 100 nm is formed on the 45°-inclined surface. Specifically, in the sputtering, a high-rate sputtering apparatus (SH-450 (tradename) manufactured by ULVAC Incorporated) is used to deposit the silver alloy for 180 seconds at a power of 0.35 kW, an argon gas flow rate of 15 sccm, and a deposition pressure of 0.25 Pa while the workpiece (optical waveguide film main body) is rotated at 2 revolutions/minute without being heated, whereby the silver alloy layer (mirror layer) having a thickness of 100 nm is deposited on the inclined surface of the optical waveguide film main body.

Thereafter, in the high-rate sputtering apparatus (SH-450) manufactured by ULVAC Incorporated, the silver alloy target is replaced by a titanium (Ti) target to perform sputtering so as to form a titanium (Ti) layer, which serves as a protective layer Specifically, the formation of the Ti layer is conducted as follows: deposition is performed for 90 seconds at a power of 0.35 kW, an argon gas flow rate of 20 sccm, and a deposition pressure of 0.30 Pa while the workpiece (optical waveguide film main body) is rotated at a rate of 2 revolutions/minute without being heated, so as to form a Ti layer having a thickness of 10 nm that covers the silver alloy layer (mirror layer) of the optical waveguide film main body.

Since the high-rate sputtering apparatus (SH-450) manufactured by ULVAC Incorporated can accommodate four kinds of targets, the above two layers are formed in a series of operations without being exposed to the outside atmospheric air during the operations.

It is confirmed by an XRD (X-ray diffraction) analysis that the Ti layer has reacted with the silver alloy layer to form a titanium-silver alloy layer.

Finally, the optical waveguide film main body having the deposited layers thereon is peeled from the dicing tape, so that an optical waveguide film is obtained which has a mirror layer covered by a protective layer and formed on an inclined surface (mirror surface); the inclined surface is a 90° optical-path deflecting portion (a portion at which the direction of the optical path is changed by 90 degrees).

Evaluation

The properties of the mirror layer are evaluated in the same manner as in Example 1. The observed reflection loss is 0.3 dB, indicating excellent properties of the mirror layer. In order to evaluate long-term reliability, an accelerated test on the long-term reliability is performed by immersing the obtained optical waveguide film in a 5% by weight saline water for 24 hours; as a result, changes such as whitening due to chlorination are not at all observed at the mirror layer, indicating high long-term reliability. However, when the immersion time in the saline water is elongated to 36 hours in the accelerated test on long-term reliability, whitening due to chlorination is slightly observed at the mirror layer. It is thus found that the single layer of Ti can serve as a protective layer for protecting the silver alloy layer (mirror layer) even though the durability thereof is inferior to that of the protective layer in which the Ti layer and the TiN layer are both included. For the purpose of comparison, a sample having only the silver alloy layer (mirror layer) without the Ti layer is prepared and evaluated; as a result complete whitening is observed and the reflectance is greatly decreased in this sample.

Example 5

In the same manner as in Example 3, application of an epoxy resin by spin coating for layer formation is repeated to form an epoxy-based three-layered film in which a low-refractive-index layer (thickness: 20 µm, refractive index: 1.51), a high-refractive-index layer (thickness: 50 µm, refractive index: 1.57), and a low-refractive-index layer (thickness: 20 µm, refractive index: 1.51) are disposed in this order.

Then, an optical waveguide film main body in which an inclined surface (mirror surface) at an inclination angle of 45° is formed at each end thereof is prepared in the same manner as in Example 3.

Thereafter, sputtering using a silver alloy target (Ag alloy No. 37 manufactured by Mitsubishi Materials Corporation) is performed while the optical waveguide film main body is still attached to a dicing tape, so that a silver alloy layer having a thickness of 100 nm is formed on the 45°-inclined surface. Specifically, in the sputtering, a high-rate sputtering apparatus (SH-450 (tradename) manufactured by ULVAC Incorporated) is used to deposit the silver alloy for 180 seconds at a power of 0.35 kW, an argon gas flow rate of 15 sccm, and a deposition pressure of 0.25 Pa while the workpiece (optical waveguide film main body) is rotated at 2 revolutions/minute without being heated, whereby the silver alloy layer (mirror layer) having a thickness of 100 nm is deposited on the inclined surface of the optical waveguide film main body.

Thereafter, in the high-rate sputtering apparatus (SH-450) manufactured by ULVAC Incorporated, the silver alloy target is replaced by a titanium (Ti) target to perform sputtering so as to form a titanium nitride (TiN) layer having a thickness of 20 nm, which serves as a protective layer.

Specifically, the formation of the TiN layer is conducted as follows: deposition is performed for 420 seconds using a Ti target at a power of 0.35 kW, an argon gas flow rate of 18 sccm, a nitrogen gas flow rate of 2 sccm, and a deposition pressure of 0.30 Pa while the workpiece (optical waveguide film main body) is rotated at a rate of 2 revolutions/minute without being heated, so as to form a TiN layer having a thickness of 20 nm that covers the silver alloy mirror layer.

Finally, the optical waveguide film main body having the deposited layer thereon is peeled from the dicing tape, so that an optical waveguide film is obtained which has a mirror layer covered by a protective layer and formed on an inclined surface (mirror surface); the inclined surface is a 90° optical-path deflecting portion (a portion at which the direction of the optical path is changed by 90 degrees).

Evaluation

The properties of the mirror layer are evaluated in the same manner as in Example 1. The observed reflection loss is 0.3 dB, indicating excellent properties of the mirror layer. In order to evaluate long-term reliability, an accelerated test on the long-term reliability is performed by immersing the obtained optical waveguide film in a 5% by weight saline water for 24 hours; as a result, whitening due to chlorination is slightly observed at the mirror layer, so that its long-term reliability is found to be inferior to a case in which the Ti layer is provided. For the purpose of comparison, a sample having only the silver alloy layer (mirror layer) without the TiN layer is prepared and evaluated; as a result complete whitening is observed and the reflectance is greatly decreased in this sample.

What is claimed is:

1. An optical waveguide comprising: an optical waveguide core through which light propagates, at least one end portion of the optical waveguide core in a longitudinal direction thereof having an inclined surface; a reflective layer provided on the inclined surface and comprising a metal layer comprising silver or a silver alloy; a protective layer disposed to cover the reflective layer; and a cladding portion enclosing the optical waveguide core and having a lower refractive index than that of the optical waveguide core, wherein the protective layer includes a titanium alloy layer and a titanium layer disposed in this order from the reflective layer side.

2. The optical waveguide according to claim 1, wherein the protective layer includes a titanium nitride layer.

3. The optical waveguide according to claim 1, wherein the protective layer further includes a titanium nitride layer disposed to cover the titanium layer.

4. The optical waveguide according to claim 1, wherein the titanium alloy layer is a titanium-silver alloy layer.

5. The optical waveguide according to claim 1, wherein the reflective layer and the protective layer are integrated to form a complex alloy in which a surface of the metal layer comprising silver or a silver alloy includes a titanium-silver alloy.

6. The optical waveguide according to claim 5, wherein the complex alloy is covered by a titanium nitride layer.

7. The optical waveguide according to claim 1, wherein the metal layer has a thickness of from about 500 nm to about 5 μm.

8. The optical waveguide according to claim 1, wherein the protective layer has a thickness of about 10 nm to about 500 nm.

9. The optical waveguide according to claim 2, wherein the titanium nitride layer has a thickness of from about 5 nm to about 50 nm.

10. The optical waveguide according to claim 1, wherein the titanium layer or the titanium alloy layer has a thickness of from about 5 nm to about 50 nm.

11. An optical transmitter and receiver module, comprising:

the optical waveguide according to claim 1;

an optical transmitter section including a light-emitting element and a first holding member that holds the light-emitting element, one end portion of the optical waveguide being held at the first holding member such that light emitted from the light-emitting element enters the optical waveguide; and an optical receiver section including a light-receiving element and a second holding member that holds the light-receiving element, the other end portion of the optical waveguide being held at the second holding member such that the light coming out of the waveguide is received by the light-receiving element.

* * * * *